Sept. 24, 1946.　　　　L. F. CARTER　　　　2,408,044
ERECTION DEVICE FOR GYROSCOPES
Filed Aug. 6, 1941　　　2 Sheets-Sheet 1
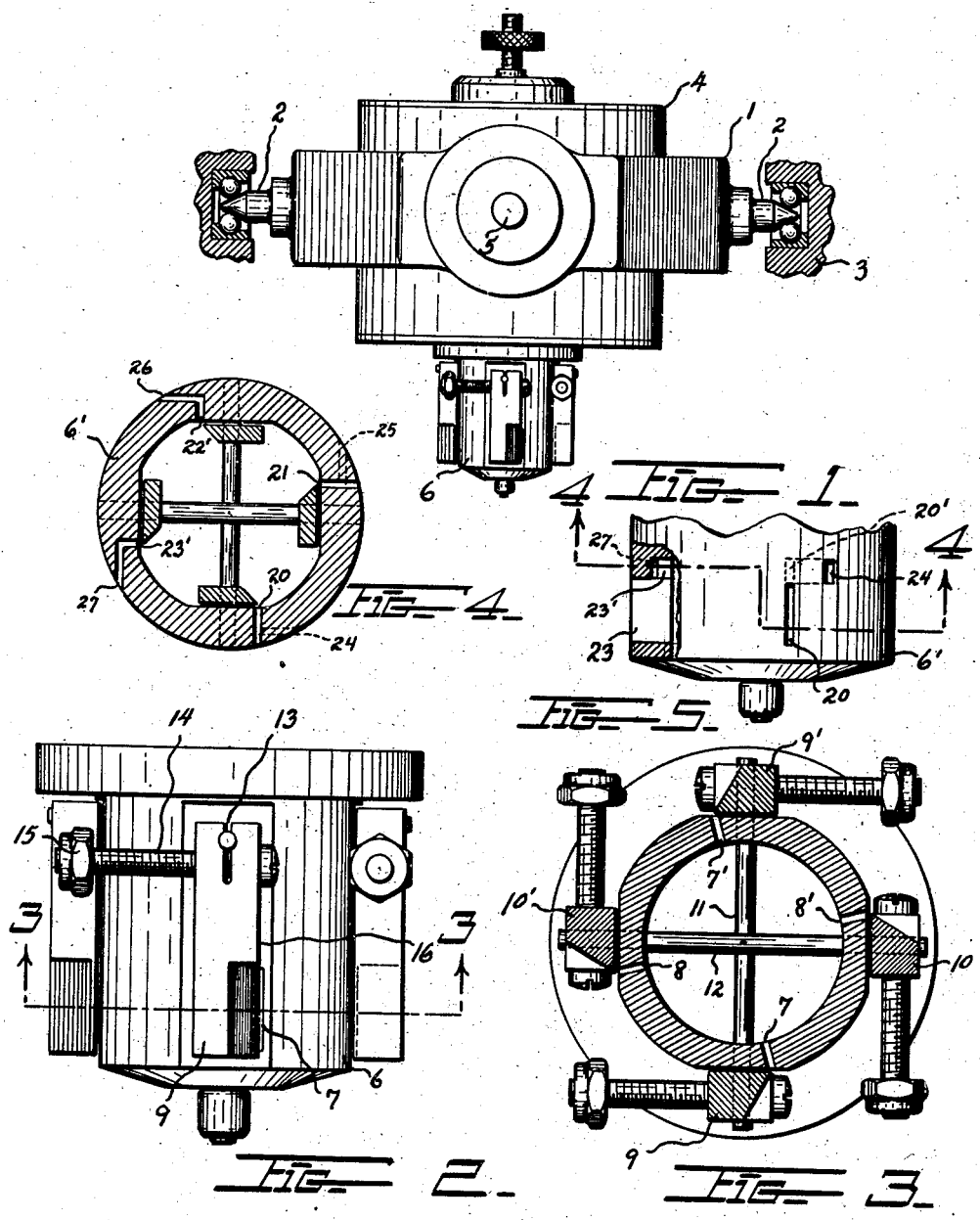
INVENTOR,
LESLIE F. CARTER,
BY
Herbert H. Thompson
HIS ATTORNEY.

Sept. 24, 1946.   L. F. CARTER   2,408,044
ERECTION DEVICE FOR GYROSCOPES
Filed Aug. 6, 1941   2 Sheets-Sheet 2

INVENTOR,
LESLIE F. CARTER,
BY
Herbert H. Thompson
HIS ATTORNEY

Patented Sept. 24, 1946

2,408,044

UNITED STATES PATENT OFFICE 2,408,044

ERECTION DEVICE FOR GYROSCOPES

Leslie F. Carter, Leonia, N. J., assignor to Sperry Gyroscope Company, Inc., Brooklyn, N. Y., a corporation of New York Application August 6, 1941, Serial No. 405,607

11 Claims. (Cl. 74—5)

This invention relates to free or three degree of freedom gyroscopes, such as gyro-verticals or gyroscopic artificial horizons now commonly employed as attitude indicators on aircraft or directional gyroscopes employed as course indicators.

For maintaining such gyroscopes erect, it has long been recognized that a torque should be applied to the gyroscope upon inclination to erect it by the shortest path or straight line to the vertical. To this end, conventional erectors such as the air jet reaction erector controlled by pendulous vanes shown in the prior patent to Bert G. Carlson No. 1,982,636, dated December 4, 1934, were designed to exert a restoring torque about an axis 90° displaced from the axis of inclination. Theoretically this should give straight line erection to the vertical, but it has been found that unfortunately bearing friction prevents this ideal condition, so that instead of balancing the gyroscope in strictly neutral equilibrium, it became the practice to make it slightly pendulous so that when the gyro is inclined, a turning moment is produced about the gimbal bearings in a direction opposite to the strain imposed by the friction opposing the precession caused by the erection torque. By this method approximately straight line erection has been obtained at the sacrifice of making the gyroscope slightly pendulous with the resultant subjection of the gyroscope to acceleration forces due to turning or change of speed of the craft on which it is mounted, which cause temporary departure of the gyroscope from the true vertical.

The purpose of the present invention is to provide a means for overcoming the above noted effect of bearing friction without making the gyroscope pendulous, so that true straight line erection is obtained together with a truly balanced gyroscope which remains unaffected by intermittent acceleration forces. In order to accomplish this purpose, instead of applying the erecting force or source of power about an axis at right angles to the axis of tilt, I propose to apply said torque so that it has a small component about the axis of precession so as to prevent movement of the gyroscope about said other axis due to unavoidable friction about the precession axis. Preferably this torque is made substantially equal and opposite to the force exerted about the precessional axis of the gyroscope.

Another object of the invention is to improve the construction of the auxiliary pendulums employed to control the air jet erectors in this type of gyroscope.

Other objects of the invention will be apparent from the following description.

The application of my invention to directional gyroscopes is also quite simple and achieves improved results. The ordinary directional gyroscope is mounted for spinning about a horizontal axis, for oscillation about a second horizontal axis normal to the spin axis, and for turning about a vertical axis which, of course, is normal to the aforesaid horizontal axes. In order to maintain the spin axis substantially horizontal, it is usual to provide a means for maintaining the plane of the rotor in the vertical plane of the vertical ring, which is thus used as a reference for the vertical since an airplane normally flies level and the directional gyroscope is positioned on the same with its axis of orientation vertical.

Referring to the drawings showing my invention as applied to several forms of free gyroscopes, Fig. 1 is a side elevation of an improved gyro-vertical of the air erected type, the indicator mechanism being omitted.

Fig. 2 is an enlarged side elevation of the lower portion of the same, showing the controlling pendulums and the controlled jets or orifices.

Fig. 3 is a sectional view taken on line 3—3 of Fig. 2, looking in the direction of the arrows.

Fig. 4 is a section similar to Fig. 3, showing a modified form of the invention taken on line 4—4 in Fig. 5.

Fig. 5 is a view similar to the central portion of Fig. 2, showing the form of the invention shown in Fig. 4.

Figure 6:
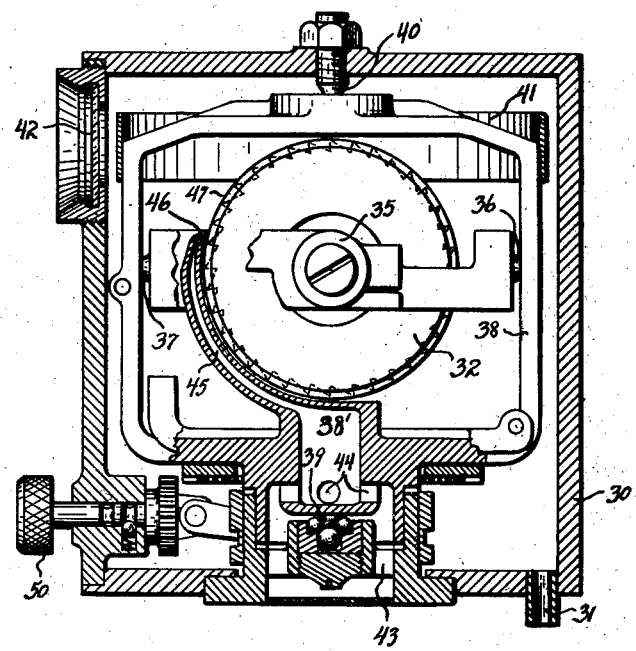
Fig. 6 shows my invention as applied to a directional gyroscope, being a vertical section of the same.
Figure 7:
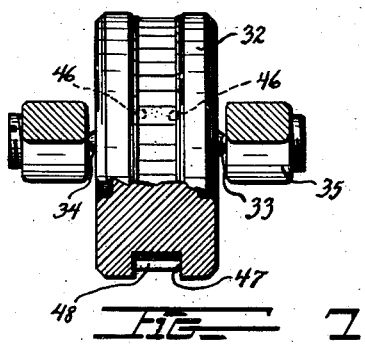
Fig. 7 is a detail of the rotor and the rotor bearing frame, partly in section.

My invention is shown in Figs. 1 to 5 as applied to a conventional air erected gyro-vertical, the same being shown as comprising a gimbal ring 1 mounted by trunnions on major axis 2, 2 in the outer casing or support 3. The gimbal ring in turn supports the rotor bearing casing or frame 4 for oscillation about a transverse axis 5—5 within the gimbal ring 1. The rotor (not shown) is journaled within the case for spinning about a vertical axis, power to spin the rotor being supplied by any suitable means such as electricity or an air pump.

Attached to the lower end of the casing 4 is a downward hollow extension 6 through which air is forced continuously from within the casing 4, so as to emerge through a plurality of laterally directed elongated ports 7, 7' and 8, 8' in the sides of the extension 6. Each port is normally equally and partially covered by the knife edges of the adjacent small pendulums 9, 9' and 10, 10', so that upon relative inclination of the pendulum and gyroscope the reaction torques from the opposite jets is unbalanced. Instead of placing the ports 7, 7' and 8, 8' truly perpendicularly to the trunnion or tilt axes 2—2 and 5—5, respectively, I have shown such ports as slightly inclined or skewed relative to the tilt axes so that although the main torque created by the jets from ports 7, 7 is about axis 2—2, a small component torque is exerted by these jets about axis 5—5. Likewise a small component torque is exerted by the ports 8, 8' about the axis 2—2 in addition to the main torque about axis 5—5.

Each pair of pendulums is shown as clamped to a common pivot rod 11 and 12, respectively, which extends across and is pivoted within extension 6. Preferably, the upper ends of the pendulums are slit at 13 to provide spring arms which are drawn together around the end of the pivot rods 11 and 12 by set screws 14. Preferably, each of said set screws is provided with an adjustable nut 15, the set screws being shown as extending in opposite directions from the two ends of each pivot pin. By adjusting the nuts, each pair of pendulums is caused to hang exactly vertical or in the proper relationship with the major axis of the elongated slots 7, 7' and 8, 8' through which air is discharged.

It may be noted also that instead of recessing the lower ends of the pendulums as in the aforesaid prior art patent, in order to place each knife edge exactly under the pivot pin, I have placed the knife edge substantially on a line with one of the edges 16 of each pendulum, which is, therefore, offset from the center plane of the gyroscope. Therefore, I have also offset the slotted jets 7, 7' and 8, 8' in order to cooperate with the knife edges and I have found that this offset does not interfere with the correct performance of the gyroscope and, in fact, it may have an advantage in connection with the inclined position of the jets since by it the offset slots of each pair may be placed on an inclined diameter of the hollow cylindrical housing 6.

By virtue of slight inclination of the jets I am able to counteract the deleterious effect of friction in interfering with straight line erection of the gyroscope. I am, therefore, able to secure straight line erection and at the same time exactly balance the gyroscope about its pivotal axes of support. My invention possesses the further advantage over making the gyroscope slightly pendulous for this purpose, that the torque exerted by the jets remains more or less a constant regardless of the angle of tilt, so that this torque may be made equal and opposite to the torque exerted by friction about this axis. The gravitational torque used in the prior art for this purpose, however, does not remain a constant but increases with the tilt, so that it balances the friction torque only at one angle of tilt and at all other angles is either too little or too great. The same defect is present in case a centralizing spring is employed for this purpose, as has been proposed.

It will be understood that the term "torque" as used in this specification and claims is not limited to a single force, but may be made up of several forces. Thus, in the normal position of the offset members of each pair of pendulums there is a reaction force or torque exerted by the jet discharged from each port, but these two forces are normally balanced so that no net torque results. In case of slight inclination, the reaction from the port which is open further than the other port over-balances the weaker force, resulting in a net restoring torque.

The component torques referred to may also be secured by more than one jet if desired. Thus, instead of having the ports at a slight angle to the plane perpendicular to the axis of inclination, as shown in Fig. 3, I may leave the main ports exactly perpendicular as now done in the prior art, but employ small auxiliary ports to exert a minor component torque about the other horizontal axis. Such a modification is shown in Figs. 4 and 5. In these figures, the pendulums are pivoted inside instead of outside the cylindrical extension 6' on the gyro case, each of which cooperates with a pair of superimposed outlet ports 20, 20', 21, 21', 22, 22' and 23, 23', the lower group of ports 20, 21, 22 and 23 being the larger and passing straight through the wall of the housing to thereby exert the main erecting torque on the gyro. The other ports 20', 21', 22' and 23', however, communicate with laterally extending passages emerging in jets 24, 25, 26 and 27 which exert the minor torque about the other axis of the gyro. It will at once be seen that this construction provides an effective line of jet action skewed relative to the tilt axes and accomplishes the same purpose as the construction described in connection with Figs. 1 to 3.

Fig. 6 shows the application of my invention to one form of directional gyroscope and is a section through the outer casing 30 of such a gyroscope, from which air is exhausted through pipe 31 for spinning the rotor. The gyroscope proper is shown as comprising a rotor 32 mounted for spinning about a normally horizontal axis on trunnions 33, 34 in a rotor bearing ring or frame 35, said frame being in turn mounted for oscillation about a second horizontal axis normal to the first as by means of trunnions 36, 37 in the vertical ring 38. The ring, in turn, is mounted for orientation about a vertical axis within the case 30 by bearings 39 and 40. A compass card is shown at 41, visible through a window 42. The usual caging mechanism for the gyroscope is shown as a mechanism connected with a knob 50.

Air for spinning the gyro is admitted through apertures 43 at the bottom of the case, the air thence passing through apertures 44 and up through channel 38' in vertical ring 38 and thence through passages 45 to spinning jet or jets 46. In the ordinary directional gyroscope, the nozzles 46 are positioned so that the jets strike the rotor approximately in the horizontal plane of the trunnions 36, 37, for the purpose described in the prior patent of Bert G. Carlson, No. 1,982,- 637, dated December 4, 1934, for Directional gyroscopes. Upon inclination of the gyro, therefore, about axis 36, 37, the jets exert a lateral force upon one or the other of the end walls 47 of the buckets or blades 48 so as to thereby exert a torque about the vertical axis of the gyroscope to cause precession about the horizontal axis and consequent leveling of the spin axis of the gyroscope.

According to my invention, however, I position the nozzle or nozzles 46 so that the air jets strike the rotor slightly above or below the trunnion axis 36, 37, so that not only is a torque exerted about the vertical axis, but also a component torque about the horizontal axis of the gyroscope in a direction to oppose any precession resulting from frictional forces about the vertical axis.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a gyroscopic artificial horizon, a gyro rotor and rotor bearing casing, means for supporting the same for oscillation about horizontal axes in neutral equilibrium, gravitationally responsive means for maintaining said spin axis erect without imparting pendulosity to the casing, including a plurality of pairs of opposed jets adapted to exert erecting torques on said casing about either of said horizontal axes, two pairs of small pendulums, a common pivot pin journaled in said casing on which the pendulums of each pair are secured, a set screw for clamping the upper end of each pendulum to said pin, and a nut on said set screw for adjusting the hang of each pair of pendulums.

2. In a gyroscopic instrument, a rotor frame, a gimbal on which said frame is pivotally mounted with the frame and gimbal axes arranged in mutually perpendicular relation, and means responsive only to tilt of the frame about the frame axis and operable to exert a torque having two components, one of which is exerted about the gimbal axis and the other of which is exerted about the axis of the frame in a direction that the same counteracts the effect of friction in the bearings of the instrument about such axis.

3. In a gyroscopic instrument, a rotor frame, a gimbal on which said frame is pivotally mounted with the frame and gimbal axes arranged in mutually perpendicular relation, and means responsive only to tilt of the frame about the gimbal axis operable to exert a torque having two components, one of which is exerted about the frame axis and the other of which is exerted about the axis of the gimbal in a direction that the same counteracts the effect of friction in the bearings of the instrument about such axis.

4. In a gyro-vertical, a gyro rotor frame, means for supporting the frame on mutually perpendicular horizontal axes in neutral equilibrium, a plurality of pendulous blades pivoted on the frame on horizontal axes respectively parallel to the aforementioned axes, and air port means adjacent each of said blades and differentially controlled thereby, each port means being directed to discharge air at an acute angle to the axis about which its blade is pivoted.

5. In a gyro-vertical, a rotor frame, means for supporting the frame on mutually perpendicular horizontal axes in neutral equilibrium, a plurality of pendulous blades pivoted on the frame on horizontal axes respectively parallel to the aforementioned axes, and air port means adjacent each of said blades differentially controlled thereby, one of which air port means is directed to discharge air parallel to the axis about which its blade is pivoted and the other of which is directed to discharge air normal to the axis about which its blade is pivoted.

6. In a gyro-vertical, the combination of a gyro rotor case, mounted for movement about mutually perpendicular major and minor axes, having a plurality of pairs of ports therein from which air is discharged, each of said pairs of ports being arranged to simultaneously exert a precessing torque about one axis and a friction overcoming torque about the other axis, and gravitationally responsive means for rendering only one of said pairs of ports effective upon tilt of the case about said major axis and the other of said pairs of ports effective upon tilt of the case about said minor axis.

7. In a gyro-vertical, the combination of a gyro rotor mounted for rotation about a normally vertical axis, means for supporting said rotor for tilting motion about a pair of mutually perpendicular normally horizontal tilt axes, and erecting means responsive to motion about one of said tilt axes for exerting a torque having a friction-compensating component about such tilt axis, said erecting means comprising jet means whose effective line of action is skewed relative to and in a plane parallel to said normally horizontal tilt axes.

8. In a gyro-vertical, a rotor frame, means for supporting the frame on mutually perpendicular horizontal axes in neutral equilibrium, a plurality of pendulous blades pivoted on the frame on horizontal axes respectively parallel to the aforementioned axes, and air port means adjacent each of said blades and differentially controlled thereby, each of said air port means being adapted to discharge an air jet having a component compensating for friction occurring about said frame axes.

9. In a gyro-vertical, a rotor frame, means for supporting the frame on mutually perpendicular horizontal axes in neutral equilibrium, a plurality of pendulous blades pivoted on the frame on horizontal axes respectively parallel to the aforementioned axes, and air port means adjacent each of said blades and differentially controlled thereby, said air port means being adapted to discharge air jets having an effective line of action skewed relative to and in a plane parallel to said frame supporting axes.

10. In a gyroscopic instrument, a rotor frame, means for supporting the frame on mutually perpendicular horizontal axes in neutral equilibrium, a plurality of internally suspended pendulous blades pivoted on said rotor frame on horizontal axes respectively parallel to the aforementioned axes and a pair of air ports externally adjacent each of said internally suspended blades and differentially controlled thereby, one of which ports is directed to discharge air parallel to the axis about which its blade is pivoted and the other of which ports is directed to discharge air normal to the axis about which its blade is pivoted.

11. In a gyroscopic instrument, a rotor frame, means for supporting the frame on mutually perpendicular axes in neutral equilibrium, a plurality of pendulous blades suspended within said rotor frame from normally horizontal axes pivoted in said rotor frame and respectively paralleling said aforementioned axes, and a plurality of pairs of ports in said rotor frame from which air is discharged, each of said pairs of ports being arranged to exert a precessing torque about one axis and simultaneously therewith a friction overcoming torque about the other axis, and gravitationally responsive means for separately rendering one of said pairs of ports operative upon tilt of said rotor frame about one of said mutually perpendicular axes and the other of said pairs of ports operative upon tilt of said rotor frame about the other of said mutually perpendicular axes.

LESLIE F. CARTER.